United States Patent [19]

Rood

[11] 4,440,370

[45] Apr. 3, 1984

[54] SECURING STAKE

[76] Inventor: Robert M. Rood, 7164 Victoria Rd., St. Paul, Minn. 55119

[21] Appl. No.: 426,143

[22] Filed: Sep. 28, 1982

[51] Int. Cl.³ .............................................. A62C 23/04
[52] U.S. Cl. ............................................ 248/75; 248/87
[58] Field of Search .................... 248/75, 76, 77, 78, 248/85, 86, 87, 545

[56] References Cited

U.S. PATENT DOCUMENTS

| D. 100,600 | 7/1936 | Luff | 248/545 |
|---|---|---|---|
| 2,711,927 | 6/1955 | Miller et al. | 248/87 |
| 2,926,874 | 3/1960 | Hahn | 248/545 |
| 2,954,194 | 9/1960 | Alfano | 248/75 |
| 3,119,587 | 1/1964 | Anderson | 248/75 |
| 3,831,891 | 8/1974 | Jester | 248/545 |
| 3,941,342 | 3/1976 | Bradshaw | 248/87 |
| 4,135,668 | 1/1979 | Winkler et al. | 248/87 |
| 4,161,302 | 7/1979 | Stuhlman | 248/87 |

*Primary Examiner*—William H. Schultz
*Assistant Examiner*—Ramon O. Ramirez
*Attorney, Agent, or Firm*—Cushman, Darby & Cushman

[57] ABSTRACT

A stake for securing a garden hose or a soaker hose, or the like. Including provisions for preventing twisting of the soaker hose.

1 Claim, 2 Drawing Figures

SECURING STAKE

BACKGROUND OF THE INVENTION

The present invention is directed to a securing stake, and in particular, to a stake for securing garden hoses, soaker hoses, electric cords, ropes, or the like to the ground.

A problem often encountered by home gardeners when using so called "soaker hoses," (relatively flat plastic hoses having a plurality of holes therein used for sprinkling water on particular plants or a particular area), is that such hoses are very susceptible to twisting and turning, and thus misdirecting the water.

Similarly, it is often desirable to maintain a rubber hose or electric cord or the like along the perimeter of a particular area. Nothing is presently available which provides a positive coupling to such hose or electric wire, which is easily detachable from the wire or hose.

SUMMARY OF THE INVENTION

The present invention provides a stake for securing for garden hoses, soaker hoses or electric cords, or the like, to the ground, which provides an easily releasable, positive coupling to the garden hose, soaker hose, electric cord or the like, and is capable of preventing twisting of the soaker hose.

Further, a stake in accordance with the present invention is of a form that is easily inserted into the ground, while at the same time is strong and rigid, and resists being twisted or turned after insertion in the ground.

BRIEF DESCRIPTION OF THE DRAWING

A preferred exemplary embodiment of the present invention will hereinafter be described in conjunction with the appended drawing, wherein like numerals denote like elements and.

DETAILED DESCRIPTION OF THE PREFERRED EXEMPLARY EMBODIMENT

Figure 1:
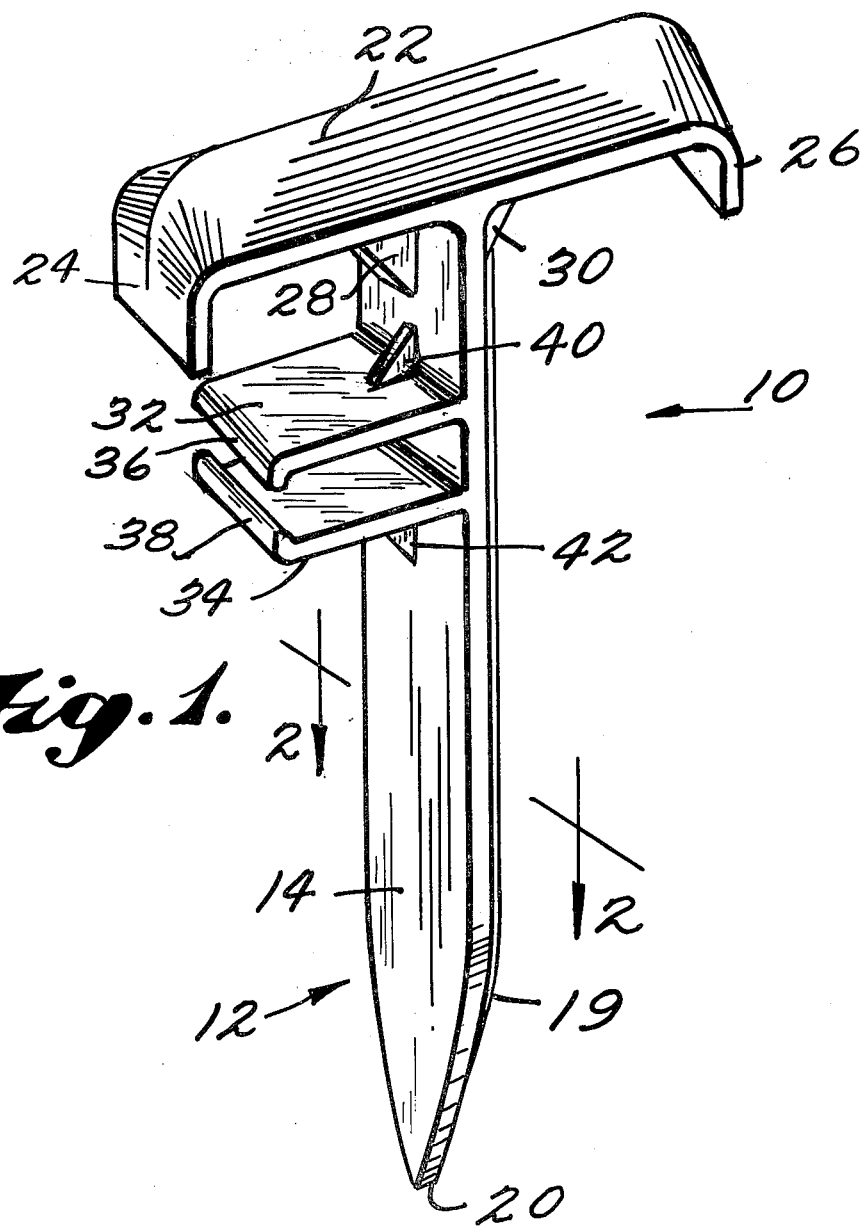
FIG. 1 is a perspective drawing of a stake in accordance with the present invention.
Figure 2:
FIG. 2 is a cross section of the blade portion of the stake of FIG. 1.

Referring now to FIGS. 1 and 2, a stake 10 in accordance with the present invention comprises an elongated blade portion 12 including a first surface 14, second surface 16 and third surface 18 (best seen in FIG. 2). First surface 14 is suitably a relatively wide substantially flat surface. Surfaces 16 and 18, are relatively narrow, and are joined at an acute angle with the edges of first surface 14. As shown in FIG. 2, blade 12 thus exhibits a triangular cross section, thick in the middle and thin at the edges. Surfaces 14, 16 and 18 all taper at one end of blade 12 to a point 20. In addition, the thickness of blade 12 in the center gradually decreases and tapers in the vicinity of point 20. For example, blade 12 is suitably approximately 110 mm in length. First surface 14 is suitably approximately 13 mm wide, and the second and third surface 16, 18 are suitably slightly more than 7 mm wide, until a point 19 approximately 3.5 cm from point 20, whereat the sides begin to taper toward point 20. Similarly, the thickness of the center of blade 12 (distance from first surface 14 to the juncture of surfaces 16 and 18) is suitably approximately 5 mm until point 19, whereat the thickness gradually decreases to approximately 1 mm at point 20. The thickness of blade 12 at the edges is suitably uniformly approximately 1 mm. The relatively wide flat surface 14 tends to prevent stake 10 from being turned once inserted in the earth, whereas the triangular cross section provides for rigidity and strength in blade 12.

A cross member portion 22 is integrally formed with the blade at the other end of blade 12. Cross member 22 has a width (as measured in the plane of surface 14) substantially equal to the width of surface 14, and extends substantially equal distances on either side of blade 12 in directions substantially perpendicular to the plane of surface 14. Relatively short downturned portions 24 and 26 are provided at each extremity of cross member 22. Downturned portion 24 and 26 extend downwardly toward point 20 a predetermined distance from the underside of cross member 22, such as, for example, 5 mm.

Respective transverse support braces 28 and 30 are also provided between cross member 22 and blade 12. Brace 28 is integrally formed between first surface 14 of blade 12 and the undersurface of cross member 22, centrally disposed at the juncture between surface 14 and cross member 22. Brace 30 is similarly integrally formed between the juncture of blade surfaces 16 and 18 and the underside of cross member 22.

Respective projecting arms 32 and 34, extending outwardly from first blade surface 14 are also provided. Arms 32 and 34 suitably are of the same width (measured in the plane of surface 14) as blade surface 14, and are generally parallel to each other and to the underside of cross member 22. Arms 32 and 34 are suitably on the order of 2 mm thick. The upper surface of projecting arm 32 is disposed at a predetermined distance from the underside of cross member 22, such as, for example, 2 cm. Similarly, the upper surface of the lower projecting arm is disposed a predetermined distance from the lower surface of the upper projecting arm 32, such as, for example, 6 mm.

Arm 32 includes at the end thereof a downturned portion 36 extending a short distance, e.g. 1 mm, towards the blade point 20. Similarly, arm 34 includes an upturned portion 38 at the end thereof, extending a short distance, e.g. 1 mm, toward upper arm 32 and cross member 22.

Transverse braces 40 and 42 are also provided for arms 32 and 34. Transverse support brace 40 is integrally formed between the upper surface of arm 32 and first blade surface 14, suitably centrally disposed at the juncture of the upper surface of arm 32 and blade surface 14. Similarly, transverse brace 42 is integrally formed between the lower surface of lower arm 34 and first blade surface 14, suitably centrally disposed at the juncture between the lower surface of arm 32 and blade surface 14.

Stake 10 is suitably formed of a tough flexible plastic such as polycarbonate so that blade 12 and arms 32 and 34 are stiffly resilient.

The distance between cross member 22 and upper arm 32 is chosen to accommodate common garden hoses. That is, the garden hose is received between cross member 22 and upper arm 32. Reception of the garden hose depresses arm 32, causing arm 32 to provide a spring bias against the garden hose. Thus, arm 32 and downturned portion 24 of cross member 22 cooperate to retain the garden hose, and provide an easily releasable positive coupling to the hose.

The relative spacing of resilient arms 32 and 34 are chosen to accommodate reception and retention of conventional soaker hose. The soaker hose is received between arms 32 and 34, slightly displacing arms 32 and 34, such that a spring action and, therefor, positive coupling is provided. It should be appreciated that arms 32 and 34 maintain the soaker hose in a flat position, and prevent twisting of the soaker hose which can cause misdirection of the water.

Similarly, standard extension cords can be accepted between resilient arms 32 and 34, and retained therebetween.

It should also be appreciated that stake 10 can be utilized as a standard hold down stake for, for example, tents or tarpaulins. A rope, affixed to the tent or tarpaulin can be accommodated between arms 32 and 34. The rope is thus prevented from slipping off the stake. Further, cross member 22 provides for ease of disengaging stake 10 from the earth.

It will be understood that the above description of a preferred exemplary embodiment of the present invention and that the invention is not limited to the specific form shown. Modifications may be made in the design and arrangement of the elements without departing from the spirit of the invention as expressed in the appended claims.

What is claimed is:

1. A securing stake comprising:
   an elongated blade portion formed of a stiffly resilient material;
   said blade portion having first, second and third integrally formed surfaces, and said first surface being a relatively wide substantially flat surface, and said second and third surfaces being relatively narrow and disposed at an angle with said first surface such that said blade portion has a generally triangular cross section and is relatively thin at the edges thereof and thick in the middle, the width of said first, second and third surfaces varying such that said blade portion tapers to a point at one end, the thickness of the middle of said blade portion also tapering in the vicinity of said point;
   a cross member portion, integrally formed with said blade portion, disposed at the end of said blade portion opposite said point, having a width in the plane of said blade portion first surface substantially equal to the width of said blade portion first surface, and extending substantially equal distances on either side of said blade portion in directions perpendicular to the plane of said blade portion first surface;
   said cross member portion including at each end thereof downturned portions extending toward said blade portion point;
   first and second transverse support braces, integrally formed between said cross member portion and said blade portion; and
   first and second stiffly resilient projecting arms integrally formed with said blade portion, extending outwardly from said blade portion first surface, said arms being generally parallel to said cross member portion, and having a width in the plane of said blade portion first surface equal to the width of the blade portion first surface;
   said first arm being disposed a first predetermined distance from said cross member and including at the end thereof a short downturned portion extending toward said blade portion point;
   said second arm being disposed a second predetermined distance from said first arm and including a short upturned portion extending toward said cross member portion;
   a third transverse support brace integrally formed between the upper surface of said first arm and said blade portion first surface; and
   a fourth transverse support brace integrally formed between the lower surface of said second arm and said blade portion first surface.

* * * * *